Nov. 29, 1966  D. E. MADDUX  3,288,913

STRAIN TERMINATION COUPLING

Filed Dec. 14, 1964  2 Sheets-Sheet 1

DUANE E. MADDUX
INVENTOR.

BY Earl F. Botts
ATTORNEY

DUANE E. MADDUX
INVENTOR.

BY *Earl F. Retts*
ATTORNEY

United States Patent Office 3,288,913
Patented Nov. 29, 1966

3,288,913
STRAIN TERMINATION COUPLING
Duane E. Maddux, Santee, Calif., assignor, by mesne assignments, to Marine Advisers, Inc., La Jolla, Calif., a corporation of Delaware
Filed Dec. 14, 1964, Ser. No. 418,066
5 Claims. (Cl. 174—79)

The present invention relates generally to a heavy duty strain termination coupling. It is particularly useful for making electrical connections under heavy mechanical load conditions and demanding sealing requirements.

A problem exists in relation to marine transmission line suspensions. In oceanographic study and research, it is common to suspend a train of sensing instruments, such as Savonius Rotors, down into the sea for substantial depths. These instruments must be connected to read-out devices at the surface. Electrical transmission lines are normally used for this purpose. The electrical transmission lines are not strong enough to support the large loads and endure the strains which are encountered. Therefore, a protective metal support cable is usually disposed around the electrical transmission lines to absorb the mechanical load. A strain termination coupling must be used to connect the protective cable to the containers for the sensing instruments.

In the past, complex and expensive strain termination couplings have been used. The metal protective cable which surrounds the electrical transmission line usually is stranded. The strands of the protective cable are separated in most of these devices so that such strands can be wound onto various types of clamping structures.

The construction of the present invention shown in the drawings provides a hollow body portion having an opening at one end for accomodating a transmission line disposed within a protective metal sheath or having a load supporting cable embodied therein. The body portion is formed in two sections and seats a load bearing pin. A simple loop arrangement around the load bearing pin couples the strain termination coupling to the load supporting portion of the transmission line assembly. The transmission line is arranged for a suitable connection to a sensing instrument. The body portion has a structure for connection to a mechanical load such as the instrument case. A tough, semi-flexible potting compound fills the interior of the coupling body portion. Thus the mechanical load is taken through the load supporting portion of the transmission line assembly, the potting compound and the coupling body portion.

It is an object of the present invention to provide an improved, efficient, heavy duty strain termination coupling for use with a transmission line assembly, which is easy to use, and which does not require special tooling.

It is another object of the present invention to provide such an improved heavy duty strain termination coupling which will accommodate transmission line assemblies of different sizes, and which can be used for in-line cable arrangements.

It is a further object of the present invention to provide such an improved heavy duty strain termination coupling which is easy to asesmble, which does not require pre-loading, and which has a long service life.

Figure 1:
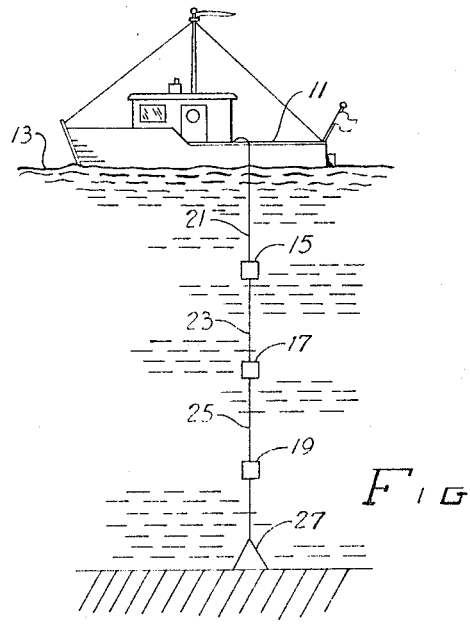
FIGURE 1 is a pictorial view showing the strain termination coupling of the present invention in use with a train of instruments suspended from a barge.

Referring to FIGURE 1 of the drawings, a barge is shown at 11 floating on the water 13. A series or train of recording instruments 15, 17 and 19 are electrically connected to read-out devices (not shown) on the barge 11 through a series of protected electrical transmission line assemblies shown generally at 21, 23 and 25. An anchor 27 is suspended from the bottom instrument 19. These instruments are normally placed at different depths and the train of instruments may extend down a considerable distance such as 15,000 feet. The instruments sense surrounding conditions such as the direction and rate of flow of water currents. This data is transmitted through the transmission lines to the read-out devices on the barge. Considerable weight, on the order of several thousand pounds for example, is imposed upon the mechanical connections between the instruments, and stresses are created due to forces such as those resulting from water movement.

Figure 2:
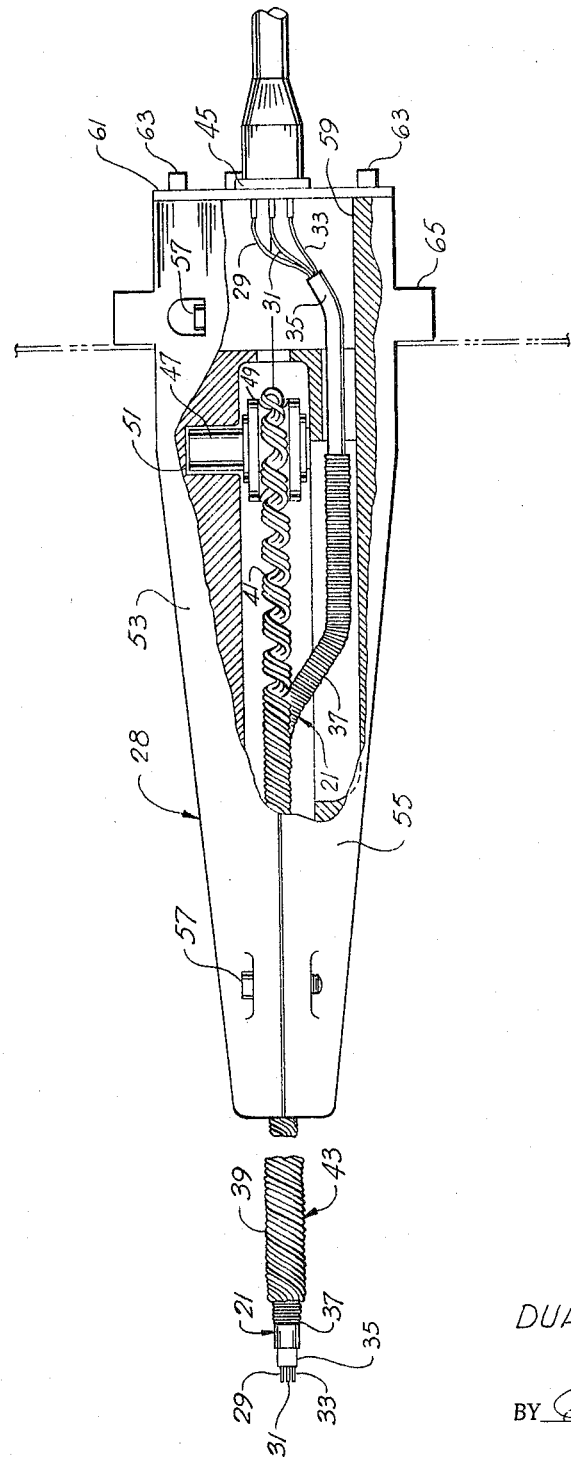
FIGURE 2 is a side view of the termination coupling of the present invention, with a portion broken away to reveal internal construction.

FIGURE 2 of the drawings shows one embodiment of the strain termination coupling of the present invention in detail. An electrical transmission line, such as the line 21, is shown extending into one end of the coupling 28. The transmission line includes wires 29, 31 and 33 nested in insulation sheath 35, and a metal protective cable 37 is disposed over the insulation sheath 35. A dead end metal armour wrap 39 of helical configuration is wrapped for a distance around the line 21 and protective cable 37. The transmission line assembly is broken away and enlarged at the left end of the drawing to adequately show detail.

Figure 3:
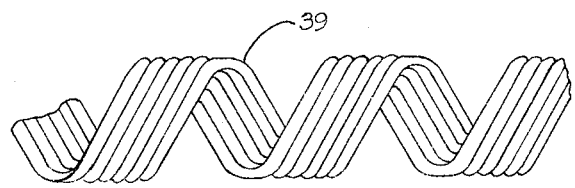
FIGURE 3 is a side elevation of the dead end wrap arrangement used with the coupling of FIGURE 2.
Figure 4:
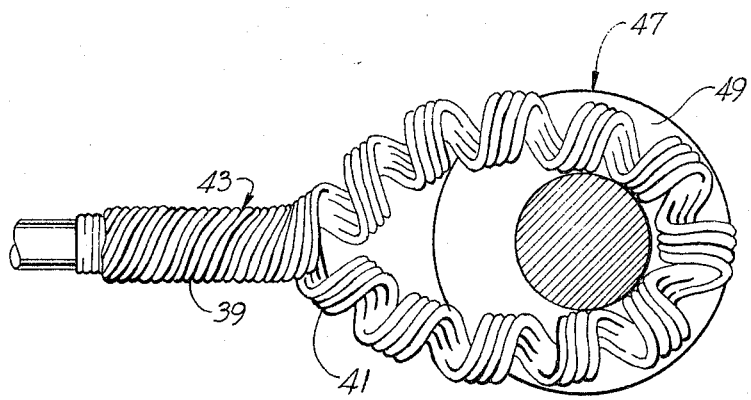
FIGURE 4 is a fragmentary section showing the dead end wrap interlocked on the electrical transmission line and parted at the right end to form a loop surrounding the load bearing pin.

The dead end wrap is shown in detail in FIGURE 3. It consists of a plurality of relatively stiff metal strands having a limited resilience which are formed together into a helical pattern. One end of the wrap can be turned back and rotated around another portion of the wrap to form a completely closed helical section. This is demonstrated in FIGURES 2 and 4 of the drawings. The wrap 39 is formed into a loop 41 at one end and is interlaced back upon itself to form the solid closed helical section 43. The coils of the helix interlock along section 43 and provide a strong mechanical locking device.

Referring to FIGURE 2, it will be noted that the line and protective cable assembly enters the body of the termination coupling 28 at one end. The line 21 is broken out of the surrounding protective cable 39 inside the coupling body, and the wires 29, 31 and 33 inside line 21 are connected to a suitable plug 45. The armour wrap 39 is looped around a load supporting member or pin 47 which is seated in the body portion of the coupling member. The pin includes a circular disc portion 49 grooved to seat the loop 41 formed in dead end wrap 39.

The pin 47 is seated in pockets 51 in the two longitudinal sections 53 and 55 which form the body portion of the coupling 28. The sections 53 and 55 are held together by means such as the bolts 57. When the coupling is assembled, the interior of the same is filled with a suitable potting material which acts as an electrical insulation and water seal. The potting material is a highly viscous resin which hardens at room temperature to a point where it provides mechanical support to the internal construction of the body portion. The resin is tough, durable and semi-flexible in its cured condition. An epoxy resin has been found successful. After the potting material is poured into the coupling through the opening 59, a plate 61, which holds plug 45, is secured in place by means such as the bolts 63. Any desired electrical connection between the sensing instrument (not shown) and the plug 45 can be made.

Different size transmission line assemblies can be accommodated. If the line assembly is smaller than the opening at the end of the coupling body, the potting material surrounds the line assembly and holds it in position upon curing. The end of the coupling body through which the line assembly enters is blocked around the line assembly by any suitable means to prevent the potting compound from leaking out when it is poured into the coupling body.

The coupling is provided with a shoulder 65 which engages connecting means on the sensing instrument container such as indicated by the dotted line flange in FIGURE 2 of the drawings.

The electrical connection is made at the coupling without subjecting the connection to the heavy mechanical loads which may be developed in the suspension.

Such mechanical loads are taken by the coupling, the potting material, the dead end wrap 39, and the metal protective cable 37. The dead end wrap 39 avoids any sharp bends in the transmission line 21 adjacent the coupling. Any force which tends to create such a bend is spread along the length of the wrap extending out of the coupling. In normal usage, the wrap will extend approximately two feet out of the coupling.

Figure 5:
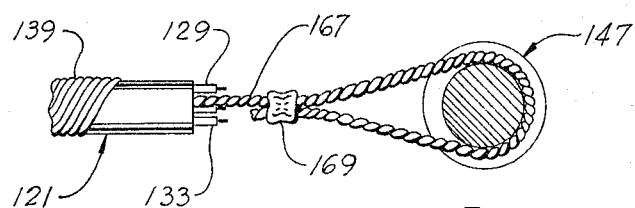
FIGURE 5 is a fragmentary view showing another arrangement for affixing the cable assembly to the load supporting pin in the coupling construction of FIGURE 2.

FIGURE 5 of the drawing shows another manner of affixing the load bearing portion of the transmission line assembly to the load supporting pin of the coupling. The transmission line assembly 121 includes a load bearing cable 167 disposed therein. The cable is looped around the pin 147 and fixed back upon itself with the fastener 169. The fastener shown is a crimp type fastener. Typical transmission wires are shown at 129 and 133.

It is to be understood that the remainder of the coupling construction is the same as in FIGURE 2. The pin 147 is positioned inside the body portion and the space inside the body portion is filled with potting compound. The dead end wrap 139 may be positioned along the portion of the transmission line assembly protruding out of the coupling to prevent sharp bends in the transmission line adjacent the coupling. In this embodiment an external protective metal cable, such as shown at 37 in FIGURE 2, may not be used. A rubber covering may be used instead.

I claim:

1. A heavy duty strain termination device for use with a transmission line, comprising:
    a hollow body portion having an opening at one end;
    a load bearing support inside said body portion;
    a flexible fastening member positioned in engagement with said load bearing support and extending out of said opening to closely engage said transmission line and take mechanical loads imposed upon said body portion and transmission line;
    connecting means in said body portion for connection with the transmission line; and
    a sealing and supporting compound disposed in said hollow body portion and filling the interior thereof.

2. A heavy duty strain termination device for use with a transmission line adapted to be connected to a suspended instrument, comprising:
    a hollow body portion having an opening at one end;
    a load bearing support inside said body portion;
    a flexible fastening member looped around said load bearing support and extending out of said opening to closely engage said transmission line and take mechanical loads imposed upon said coupling and transmission line, said fastening member locking upon itself;
    connecting means in said body portion for connection with the transmission line;
    a sealing and supporting compound disposed in said hollow body portion and filling the interior thereof; and
    mechanical connecting means on said body portion for connection with the instrument.

3. A heavy duty strain termination device for use with a transmission line adapted to be connected to an instrument suspended in a liquid, comprising:
    a hollow body portion formed of multiple longitudinal sections and having an opening at one end;
    a load bearing support inside said body portion;
    a flexible fastening member positioned in engagement with said load bearing support and extending out of said opening to closely engage said transmission line for a distance from the said body portion and transmission line, said fastening member locking upon itself;
    connecting means in said body portion for connection with the transmission line;
    a sealing and supporting compound disposed in said hollow body portion and filling the interior thereof; and
    mechanical connecting means on said body portion for connection with the instrument.

4. A heavy duty strain termination for use with an electrical transmission line adapted to be electrically connected to an instrument suspended in a liquid, comprising:
    a hollow body portion formed of multiple longitudinal sections and having an opening at one end;
    a load bearing support inside said body portion;
    a flexible helical fastening member positioned in engagement with said load bearing support and extending out of said opening to closely engage said transmission line for a distance from the end of said body portion and take mechanical loads imposed upon said body portion and transmission line, said fastening member locking upon itself;
    electrical connecting means in said body portion for connection with the transmission line;
    a sealing compound disposed in said hollow body portion and filling the interior thereof; and
    mechanical connecting means on said body portion for connection with the instrument.

5. A heavy duty strain termination coupling for use with a transmission cable assembly which assembly includes a transmission line and a flexible load bearing member lying closely adjacent said line, the strain termination coupling being capable of use with high mechanical loads on the order of at least several hundred pounds, and comprising:
    a body portion including two separate longitudinal sections fastened together to form an internal space, said sections being capable of disassembly;
    an anchor member in said body portion for coupling to the load bearing member of the cable assembly to support mechanical loads imposed on the cable assembly;
    connector means in said body portion for connection to the transmission line in a manner which is substantially free of mechanical loads;
    a potting compound disposed in said body portion to fill the internal space therein; and
    means on said body portion for fastening it to a mechanical load.

No references cited.

LEWIS H. MYERS, *Primary Examiner.*

J. F. RUGGIERO, *Assistant Examiner.*